US012154347B2

(12) United States Patent
Bogun et al.

(10) Patent No.: US 12,154,347 B2
(45) Date of Patent: Nov. 26, 2024

(54) REGION DETECTION AND GEOMETRY PREDICTION (71) Applicant: Waymo LLC, Mountain View, CA (US)

(72) Inventors: Ivan Bogun, San Jose, CA (US); Sung Min Park, Cambridge, MA (US)

(73) Assignee: Waymo LLC, Mountain View, CA (US)

(*) Notice: Subject to any disclaimer, the term of this patent is extended or adjusted under 35 U.S.C. 154(b) by 440 days.

(21) Appl. No.: 17/691,103

(22) Filed: Mar. 9, 2022

(65) Prior Publication Data

US 2022/0292840 A1 Sep. 15, 2022

Related U.S. Application Data (60) Provisional application No. 63/158,835, filed on Mar. 9, 2021.

(51) Int. Cl.
*G06V 20/58* (2022.01)
*G01S 17/89* (2020.01)
(Continued)

(52) U.S. Cl.
CPC .............. *G06V 20/58* (2022.01); *G01S 17/89* (2013.01); *G06T 7/75* (2017.01); *G06V 20/588* (2022.01); *G06T 2207/10028* (2013.01); *G06T 2207/20081* (2013.01); *G06T 2207/20084* (2013.01); *G06T 2207/30252* (2013.01)

(58) Field of Classification Search
CPC .... G06V 20/58; G06V 20/588; G06V 10/454; G06V 10/774; G06V 10/82; G06V 20/56; G01S 17/89; G06T 7/75; G06T 2207/10028; G06T 2207/20081; (Continued)

(56) References Cited

U.S. PATENT DOCUMENTS

2019/0156128 A1* 5/2019 Zhang ................. G06V 20/588
2022/0092983 A1* 3/2022 Hong ................. G01C 21/3407

OTHER PUBLICATIONS

Söntges ("2017. Computing the drivable area of autonomous road vehicles in dynamic road scenes. IEEE Transactions on Intelligent Transportation Systems, 19(6), pp. 1855-1866.") (Year: 2017).*

(Continued)

*Primary Examiner* — Edward F Urban
*Assistant Examiner* — Wassim Mahrouka
(74) *Attorney, Agent, or Firm* — Fish & Richardson P.C.

(57) ABSTRACT

Methods, systems, and apparatus, including computer programs encoded on computer storage media, for detecting regions of an environment. One of the methods includes receiving a representation of a scene in an environment; processing the representation using a center prediction neural network to generate: (i) features of the scene in the environment, and (ii) a respective center score corresponding to each of a plurality of locations in the environment; selecting, based on the respective center scores, one or more of the plurality of locations; and for each selected location: processing an input comprising the features of the scene in the environment and data specifying the selected location using a geometry prediction neural network to generate a geometry prediction that represents a geometry of the region that is centered at the selected location.

21 Claims, 5 Drawing Sheets (51) Int. Cl.
  *G06T 7/73* (2017.01)
  *G06V 20/56* (2022.01)
(58) Field of Classification Search
  CPC . G06T 2207/20084; G06T 2207/30252; G06T 7/11
  See application file for complete search history.

(56) References Cited

OTHER PUBLICATIONS

Chen et al., "BSP-Net: Generating Compact Meshes via Binary Space Partitioning," Proceedings of the IEEE/CVF Conference on Computer Vision and Pattern Recognition (CVPR), 2020, pp. 45-54.
Deng et al., "CvxNet: Learnable Convex Decomposition," Proceedings of the IEEE/CVF Conference on Computer Vision and Pattern Recognition (CVPR), 2020, pp. 31-44.

* cited by examiner

REGION DETECTION AND GEOMETRY PREDICTION

CROSS-REFERENCE TO RELATED APPLICATION

This application claims the benefit of U.S. Provisional Application No. 63/158,835, filed on Mar. 9, 2021. The disclosure of the prior application is considered part of and is incorporated by reference in the disclosure of this application.

BACKGROUND

This specification relates to detecting regions in a scene of an environment. For example, the region detection may be performed by an autonomous vehicle navigating through the environment. Autonomous vehicles include self-driving cars, boats, and aircraft. Autonomous vehicles use a variety of on-board sensors and computer systems to measure nearby objects and use these measurements to make control and navigation decisions.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that detects and predicts the geometry of regions in an environment. That is, given a representation of an environment, the system detects where regions of a particular type are located in the environment and predicts the geometry of each detected region. For example, the particular type of region can be one or more types of road feature, e.g., a crosswalk, a driveway, a speed bump, and so on. As another example, the particular type of region can be one or more types of dynamic objects, e.g., a vehicle, a cyclist, a pedestrian, and so on.

Accurately detecting and predicting the geometry of regions can provide an important and useful signal to an autonomous vehicle or another agent, e.g., a robot, navigating through an environment. For example, accurately predicting the geometry of moving objects can assist the autonomous vehicle or other agent in navigating through the environment without colliding with the moving objects. As another example, many machine learning models that are used in planning the trajectory of the vehicle or agent require inputs that accurately represent the geometry of road features. For example, many machine learning models that are used to predict the behavior of other agents in the environment receive an input that represents the road graph, i.e., the set of road features that are located in the vicinity of the autonomous vehicle or other agent, using polygon geometries.

Some existing techniques attempt to predict the geometry of regions in a scene using bounding boxes. However, bounding boxes impose constraints on the geometry of regions that may not be accurate for many types of regions, i.e., because bounding boxes only represent the geometry as an approximately rectangular box even though many different regions can have geometries that are much more complex.

Other existing techniques attempt to predict the geometry of regions using per-pixel or per-point estimates. These techniques attempt to assign to each point or pixel in a sensor measurement a label that indicates whether the point or pixel is part of a particular type of region in the environment. However, while this allows for a much wider array of possible geometries to be represented, because such fine-grained labeling is very difficult and can be inherently ambiguous, these techniques can generate inaccurate labels for significant portions of the scene, resulting in inaccurate geometries for many of the regions in the scene. Moreover, performing this per-pixel or per-point labeling can require relying on heuristics that may not be valid across all scenes that can be encountered by a vehicle or agent.

This specification describes techniques for both detecting regions in an environment and predicting the geometry of these predicted regions. More specifically, as will be described in more detail below, the techniques described in this specification result in geometry predictions that represent the geometry of a corresponding region in the environment as a collection of one or more convexes, i.e., convex polytopes, that are each defined by a set of hyperplanes. By generating predictions as a collection of convexes, the described techniques can effectively represent more complex geometries than techniques that require geometries to be represented as bounding boxes. Moreover, by first detecting regions and then only generating geometry predictions for detected regions, i.e., rather than for the entire scene, the described techniques consume fewer computational resources, e.g., memory and processor cycles, than techniques that require per-pixel or per-point labeling. Additionally, the described techniques use a neural network that has been trained end-to-end and do not rely on any heuristics, allowing the described techniques to generalize to different navigation scenarios effectively. Thus, the described techniques generate accurate geometry predictions that effectively represent complex region geometries while remaining computationally efficient. Accordingly, the described techniques are particularly adapted for being deployed on-board an autonomous vehicle or other agent in order to improve the operation of the autonomous vehicle or other agent.

Figure 1A:
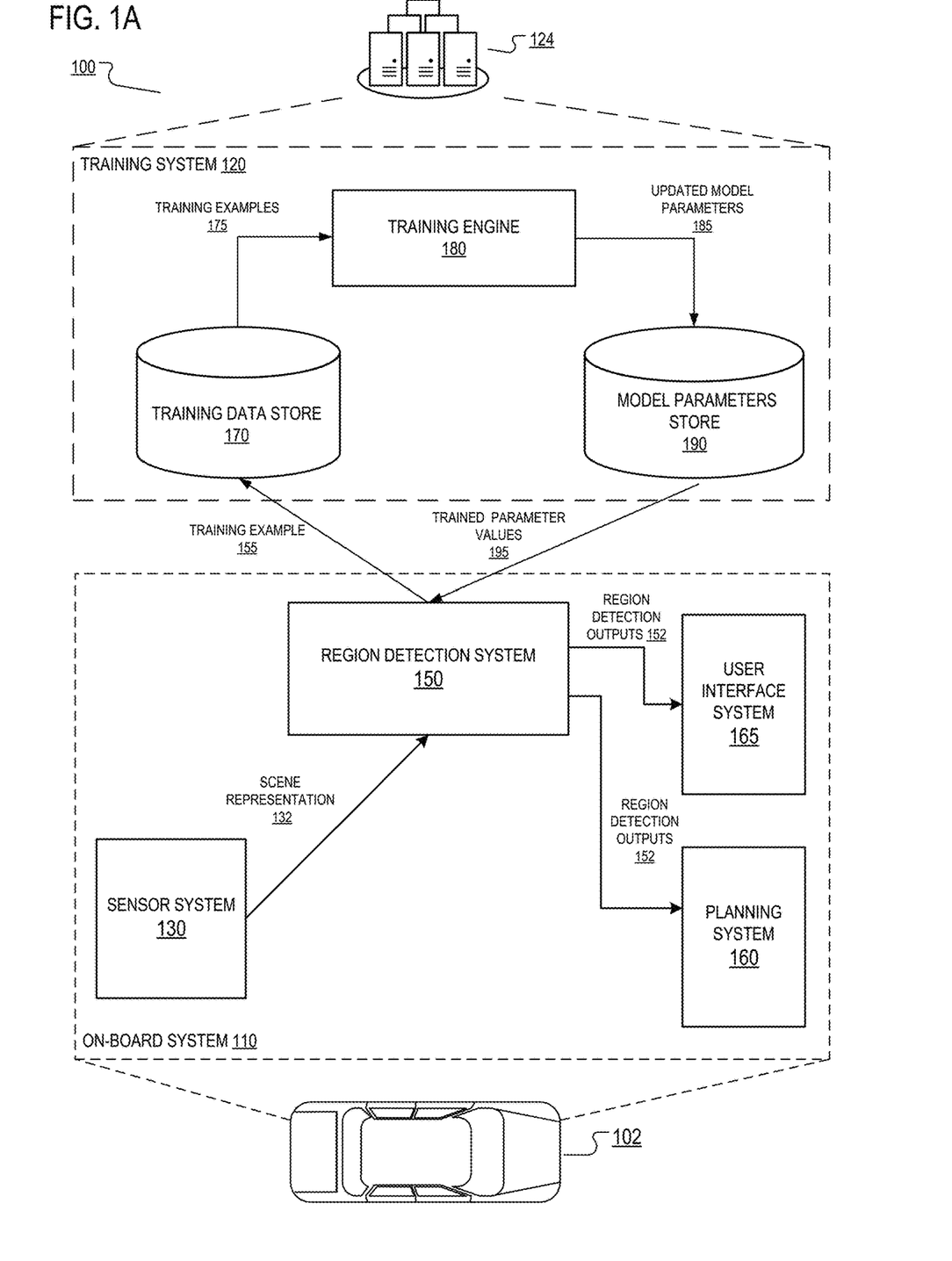
FIG. 1A is a diagram of an example system.

FIG. 1A is a diagram of an example system 100. The system 100 includes an on-board system 110 and a training system 120.

The on-board system 110 is located on-board a vehicle 102. The vehicle 102 in FIG. 1A is illustrated as an automobile, but the on-board system 102 can be located on-board any appropriate vehicle type. In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 can include one or more laser sensors, e.g., lidar sensors, that generate scene representation 132 by detecting reflections of laser light, and optionally one or more other sensors, e.g., radar sensors that detect reflections of radio waves, camera sensors that detect reflection of visible light, and so on.

A point cloud generally includes multiple points that represent a sensor measurement of a scene in an environment captured by one or more sensors. Each point has a location in a specified coordinate system, e.g., a three-dimensional coordinate system centered at the sensor, and can optionally be associated with additional features, e.g., intensity, second return, and so on.

As the vehicle 102 navigates through the environment, various sensors capture measurements of the environment. For example, a laser sensor can repeatedly capture point clouds during the navigation.

Once the sensor subsystems 130 generate the measurements at any given time point, the sensor subsystems 130 can generate a scene representation 132 of a scene of the environment from raw sensor data, i.e., from the measurements captured by one more of the sensors.

The sensor subsystems 130 then provides the scene representation 132 to a region detection system 150, also on-board the vehicle 102. For example, the scene representation 132 can be a top-down representation that represents the scene, i.e., the region of the environment that is within the range of one or more sensors of the vehicle 102, in a top-down coordinate system, e.g., one that is centered at the location of the vehicle 102. The top-down representation can be generated from, e.g., a point cloud or other data captured by a laser sensor The region detection system 150 processes the scene representation 132 to generate a region detection output 152.

The region detection output 152 identifies one or more regions in the scene, e.g., in the top-down coordinate system, and predicts the geometry of each identified region. That is, the region detection output 152 includes a respective geometry prediction for each region that the system 150 has detected in the environment using the scene representation 132.

In some cases, the system 150 can be configured to detect (and predict the geometry of) a single type of environment region. As a particular example, the system 150 can be configured to detect different instances of a particular type of road feature in an environment, e.g., a crosswalk, a speed bump, a driveway, and so on. As another particular example, the system 150 can be configured to detect regions that are occupied by objects, e.g., dynamic objects like vehicles, cyclists, pedestrians, and so on, or static objects like road signs, stoplights, and so on.

In other cases, the system 150 can be configured to detect (and predict the geometry of) multiple different types of environment regions, e.g., multiple different types of road features or both road features and regions that are occupied by objects.

A given geometry prediction represents the geometry of a corresponding region in the environment as a collection of one or more convexes, i.e., convex polytopes. A polytope is a geometric object with flat sides. A convex polytope is a polytope that is convex, i.e., that encloses a convex set of points.

Each convex within the collection is represented by a set of hyperplanes. Thus, the geometry prediction specifies, for each of the one or more convexes that make up the corresponding region, the respective set of hyperplanes that define the convex.

Thus, rather than representing geometries using bounding boxes or attempting to segment each point in the scene representation 132, the system 150 instead represents the predicted geometries using convexes.

More specifically, the region detection system 150 processes the scene representation 132 using a set of neural networks and in accordance with trained parameter values 195 of the set of neural networks to generate the region detection output 152. Generating the region detection output 152 will be described in more detail below with reference to FIGS. 2 and 4.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the region detection outputs 152 generated by the region detection system 150 to one or more other on-board systems of the vehicle 102, e.g., the planning system 160 and/or a user interface system 165.

When the planning system 160 receives the region detection outputs 152, the planning system 160 can use the region detection outputs 152 to generate planning decisions that plan a future trajectory of the vehicle, i.e., to generate a new planned vehicle path.

Generally, the planning system 160 can use the region detection outputs 152 as part of planning a future trajectory in any of a variety of ways.

For example, the planning system 160 can use the region detection outputs 152 to identify the positions of moving objects in the scene and generate a new planned vehicle path that avoids a potential collision with any of the moving objects and cause the vehicle 102 to follow the new planned path, e.g., by autonomously controlling the steering of the vehicle.

As another example, the planning system 160 can use the region detection outputs 152 to generate an input for a downstream task. For example, the planning system 160 can use the region detection outputs 152 to generate a polygonal representation of one or more regions in the environment and provide the polygonal representations as input to a neural network that is configured to perform a downstream task, e.g., object tracking or behavior prediction. The planning system 160 can then use output of this downstream task to generate a new planned path for the vehicle 102. For example, the planning system 160 can represent a region that corresponds to a road feature as a polygon using the geometry prediction for the region in an input to a behavior prediction neural network that predicts the future behavior of agents in the vicinity of the vehicle 102.

When the user interface system 165 receives the region detection outputs 152, the user interface system 165 can use the region detection outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the region detection outputs 152 may contain a geometry prediction for a speed bump, crosswalk, driveway, or other road feature around which the vehicle 102 should slow down to ensure safe operation. In this example, the user interface system 165 can present an alert message to the driver of the vehicle 102 with instructions to adjust the trajectory of the vehicle 102 to slow down in the vicinity of the road feature or render the road feature as a polygon on a display of the area surrounding the vehicle that is shown in the visual display system.

The region detection system 150 can obtain the trained parameter values 195, i.e., the trained parameter values of the neural networks used by the region detection system 150, from a model parameters store 190 in the training system 120.

The training system 120 is typically hosted within a data center 124, which can be a distributed computing system having hundreds or thousands of computers in one or more locations.

The training system 120 receives raw training examples from vehicles operating in the real world and/or from other sources, e.g., synthetic training examples generated in simulation or training examples generated by sensors on other agents, e.g., robots or other moving agents. For example, the training system 120 can receive raw training examples 155 from the vehicle 102 and one or more other agents that are in communication with the training system 120.

Each raw training example 155 can be processed by the training system 120 to generate a new training example 175. In particular, each raw training example 155 includes a scene representation of a scene in the environment.

The new training example 175 includes (i) the scene representation and (ii) a ground truth region detection output that includes a respective ground truth geometry prediction for each of one or more regions in the scene representation. The training system 120 can generate the ground truth detection outputs, e.g., by providing the scene representations for presentation to users and receiving inputs from the users specifying the actual geometries of each region of the type or types that the system 150 is configured to detect that is present in the scene representation.

The training data store 170 provides training examples 175 to a training engine 180, also hosted in the training system 120. The training engine 180 uses the training examples 175 to update the parameters of the neural networks, and provides the updated model parameters 185 to the model parameters store 190. That is, the training engine 180 trains the neural networks on the training examples 175 to minimize a loss function using gradient-based machine learning techniques. Training the neural networks and the loss function used for the training are described in more detail below with reference to FIG. 3.

Once the parameter values of the neural network have been fully trained, the training system 120 can send the trained parameter values 195 to the region detection system 150, e.g., through a wired or wireless connection.

While this specification describes that region detection outputs are generated on-board an autonomous vehicle, more generally, the described techniques can be implemented on any system of one or more computers that receives point clouds of scenes in an environment.

As one example, the region detections can be made on-board a different type of agent that has a laser sensor and that interacts with objects as it navigates through an environment. For example, the region detections can be made by one or more computers embedded within a robot or other agent.

As another example, the region detections can be made by one or more computers that are remote from the agent and that receive scene representations generated from data captured by the sensors of the agent. In some of these examples, the one or more computers can use the location predictions to generate control decisions for controlling the agent and then provide the control decisions to the agent for execution by the agent.

As another example, the region detections may be made in a computer simulation of a real-world environment being navigated through by a simulated autonomous vehicle and the target agents. Generating these predictions in simulation may assist in controlling the simulated vehicle and in testing the realism of certain situations encountered in the simulation. More generally, generating these predictions in simulation can be part of testing the control software of a real-world autonomous vehicle before the software is deployed on-board the autonomous vehicle, of training one or more machine learning models that will later be deployed on-board the autonomous vehicle, or both.

Figure 1B:
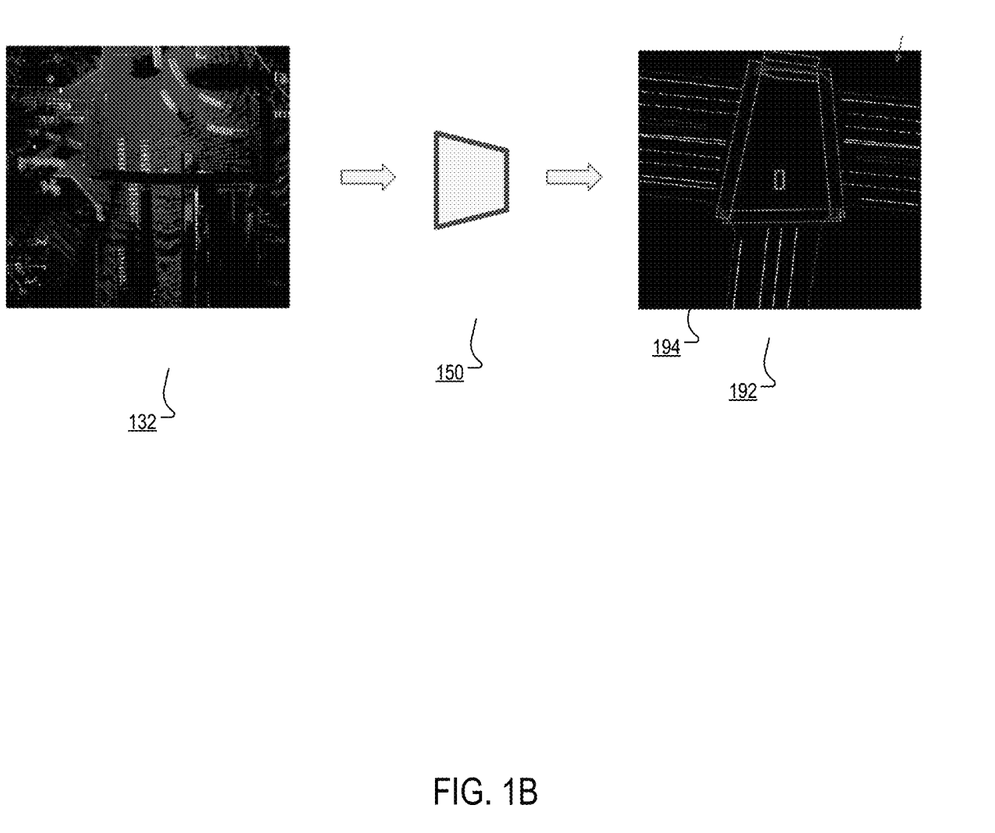
FIG. 1B shows an example polygonal representation generated from a region detection output generated by the region detection system.

FIG. 1B shows an example polygonal representation 192 generated by the region detection system 150 from a scene representation 132.

In the example of FIG. 1B, the scene representation 132 is a top-down representation that represents the scene, i.e., the region of the environment that is within the range of one or more sensors of the vehicle, in a top-down coordinate system, that is centered at the location of the vehicle and is generated from data captured by a laser sensor.

The polygonal representation 192 shows road features that have been detected in the scene representation 132, with each road feature being represented by a respective polygon, line, or curve. For example, the scene representation 192 includes a respective polygon 194 for each of a set of crosswalks across an intersection.

Figure 2:
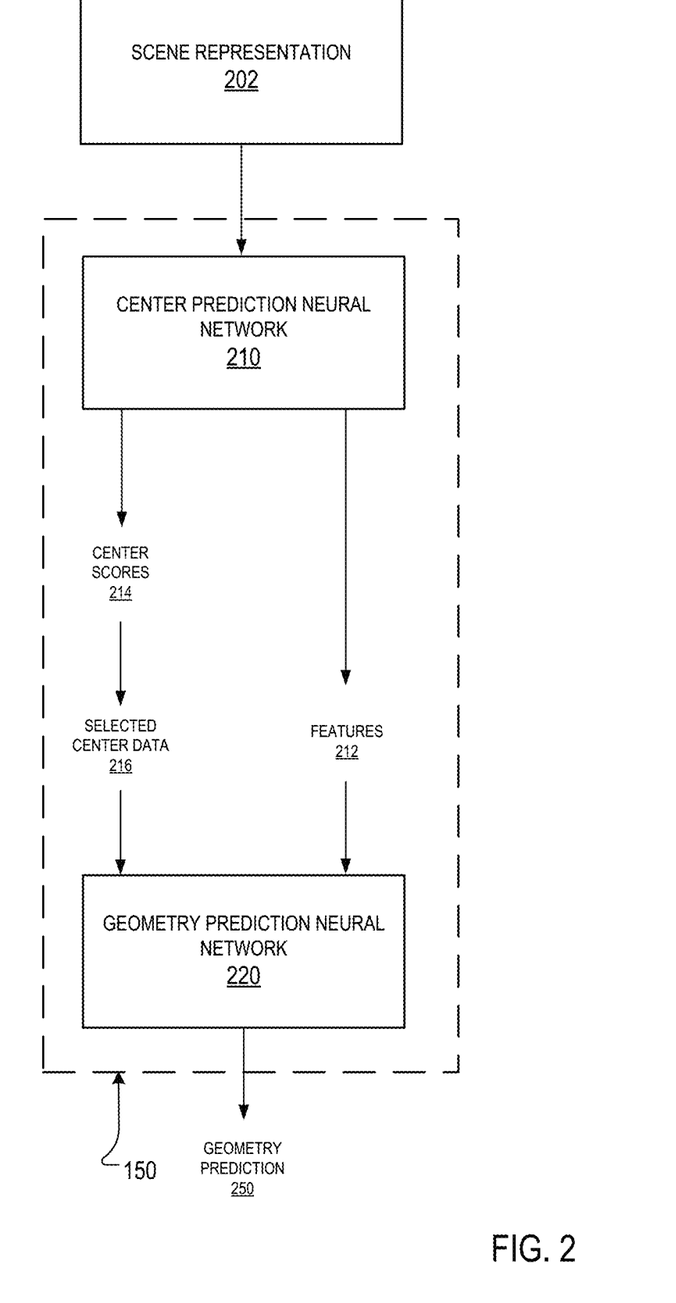
FIG. 2 shows the operation of the region detection system

As will be described in more detail below with reference to FIG. 2, the system 150 (or another system on-board the vehicle 102) can generate the polygonal representation 192 from respective geometry predictions for each detected road feature. For example, the system 150 can detect each crosswalk in the scene representation 192, and then generate a respective geometry prediction for each of the detected crosswalks. The geometry prediction for a given region specifies, for each of one or more convexes in the geometry of the given region, a respective plurality of hyperplanes that define the convex. A hyperplane is a subspace whose dimension is one less than that of its ambient space. Thus, each hyperplane is a subspace whose dimension is one less than that of the scene representation 132. In the example of FIG. 2, the representation 132 is two-dimensional and each hyperplane is therefore a 1-dimensional line. The system 150 can generate the polygonal representation of a given region from the data specifying the hyperplanes by identifying, as the polygon, the area that is enclosed by the hyperplanes. Thus, the system 150 can represent the geometry more accurately than other systems that can only represent geometries as bounding boxes, i.e., because a polygon can represent a more complex geometry than a rectangular box, and more accurately than other systems that attempt to label each pixel in the representation 132, i.e., because generating polylines is much less error prone than labeling individual pixels.

FIG. 2 is a diagram of the operations performed by the region detection system 150 to generate a geometry prediction for a given detected region.

As shown in FIG. 2, the region detection system 150 receives as input a representation 202 of a scene in an environment. As described above, the representation 202 can be a top-down representation of the scene in the environment generated from measurements captured by one or more laser sensors. For example, the vehicle 102 can generate the representation 202 by projecting each three-dimensional point in a point cloud into a top-down, two-dimensional coordinate system that is centered at the location of the vehicle 102.

The region detection system 150 then processes the representation 202 using a center prediction neural network 210 to generate features 212 of the scene in the environment and center scores 214.

The center scores 214 include a respective center score corresponding to each of a plurality of locations in the environment. The respective center score corresponding to any given location represents the predicted likelihood, i.e., as determined by the center prediction neural network 210, that the center of a region is located at the given location.

Generally, each of the plurality of locations corresponds to a different portion of the top-down representation of the environment. For example, each location can correspond to a respective pixel in the top-down representation. In this example, the center score prediction neural network 210 generates a respective center score for each pixel in the representation 202 that represents the likelihood that a region is centered at the environment location corresponding to the pixel.

The features 212 of the scene in the environment include a respective feature scalar or vector for each of the plurality of locations in the environment.

The center score prediction neural network 210 can generate the features 212 in any of a variety of ways.

As one example, the features 212 can be the outputs of one of the hidden layers of neural network 210.

As another example, the center score prediction neural network 210 can have two neural network heads that each include a respective set of neural network layers. For example, the neural network 210 can include a shared backbone that processes the representation 202 to generate a shared feature representation, one neural network head that is configured to generate the center scores 214 by processing the shared feature, and another neural network head that is configured to generate a respective pixel prediction score for each of a plurality of pixels in the representation. The pixel prediction score for a given pixel represents the likelihood that a region instance is depicted at the pixel. That is, unlike the center scores 214, which represent the likelihood that a region is centered at a corresponding location, the pixel prediction scores represent the likelihood that any portion of a region is depicted at the pixel.

In these cases, the features 212 can be the pixel prediction scores or can be the outputs of a hidden layer in the neural network head that generates the pixel prediction scores.

The center prediction neural network 210 can have any appropriate architecture that allows the neural network to map the representation 202 to the center scores 214 and the features 212. For example, the neural network 210 can be a convolutional neural network that includes a convolutional backbone and two convolutional neural network heads. One example of such an architecture is the U-Net architecture.

The region detection system 150 then selects, based on the center scores 214, one or more of the locations in the environment. For example, the system 150 can select the one or more locations by selecting each location that has a score that exceeds a threshold score, by selecting a threshold number of highest-scoring locations, or by selecting at most the threshold number of locations that have the highest center scores and that have center scores that exceed the threshold score. If no locations have center scores that satisfy the requirements for selection, the system 150 can determine that no regions have been detected in the representation 202.

In some implementations, the system 150 can apply one or more filtering techniques to the center scores 214 prior to selecting the locations. In particular, the system 150 can apply one or more filtering techniques that remove center scores 214 that are likely portions of the same region as another, higher scoring region. For example, the system 150 can apply non-maximum suppression or another filtering technique.

For each selected location, the region detection system 150 then processes an input that includes the features 212 of the scene and center data 216 specifying the selected location using a geometry prediction neural network 220 to generate a geometry prediction 222 for the selected location. For example, the center data 216 can be a feature map that has the same spatial dimensionality as the features, i.e., that includes a respective value for each of the locations, and that identifies the selected location. For example, the feature map can be a one-hot feature map that has a 1 for the selected location and a 0 for all other locations. In these examples, the input can be a concatenation of the features 212 and the center data 216 along the depth dimension.

The geometry prediction 222 represents the geometry of the region that is centered at the selected location as a collection of one or more convexes. In particular, the geometry prediction 222 specifies, for each of the one or more convexes, a respective plurality of hyperplanes that define the convex.

More specifically, the geometry prediction 222 includes, for each hyperplane of each convex, parameters of a signed distance function that measures a signed distance of any given point in the environment from the hyperplane. That is, for each hyperplane, the output of the system 150 specifies the signed distance function that measures the signed distance of any given point in the environment from the hyperplane.

The parameters of the signed distance function include a normal, e.g., a unit normal corresponding to the hyperplane and, optionally, an offset of the hyperplane from the origin of the coordinate system of the representation 202. Thus, in these cases, the geometry prediction 222 can include, for each hyperplane, the endpoint x, y coordinates of the unit normal, the offset in the x dimension of the hyperplane, and the offset in they direction of the hyperplane.

The geometry prediction neural network 220 can have any appropriate architecture that maps the input that includes the selected center data 214 and the features 212 to an output that includes a respective set of parameters for each hyperplane of each convex.

As a particular example, the neural network 220 can include an encoder neural network configured to process the input to generate a set of hyperplane parameters and a decoder neural network configured to process the set of hyperplane parameters to generate the geometry prediction. An example of such an architecture is the CvxNet architecture. CvxNets are described in more detail in Deng, et al, CvxNet: Learnable Convex Decomposition, arXiv: 1909.05736, available at https://arxiv.org/abs/1909.05736.

The number of convexes for which the neural network 220 generates outputs is generally fixed prior to training the neural network 220. If a region has a simpler geometry that can be represented with fewer convexes than the fixed number, the neural network is trained to generate outputs defining redundant hyperplanes, i.e., so that the region enclosed within the hyperplanes defined by the output of the neural network 220 does not change if the redundant hyperplanes are removed.

In some implementations, the system 150 performs the processing of the geometry prediction neural network 220 in parallel for each selected location, allowing the geometry predictions 222 for the selected locations to be generated with minimal latency.

Once the geometry predictions 222 are generated, in some implementations, the system 150 can generate polygonal representations of the detected regions in the scene using the geometry prediction 222, e.g., as shown above with reference to FIG. 1B.

Figure 3:
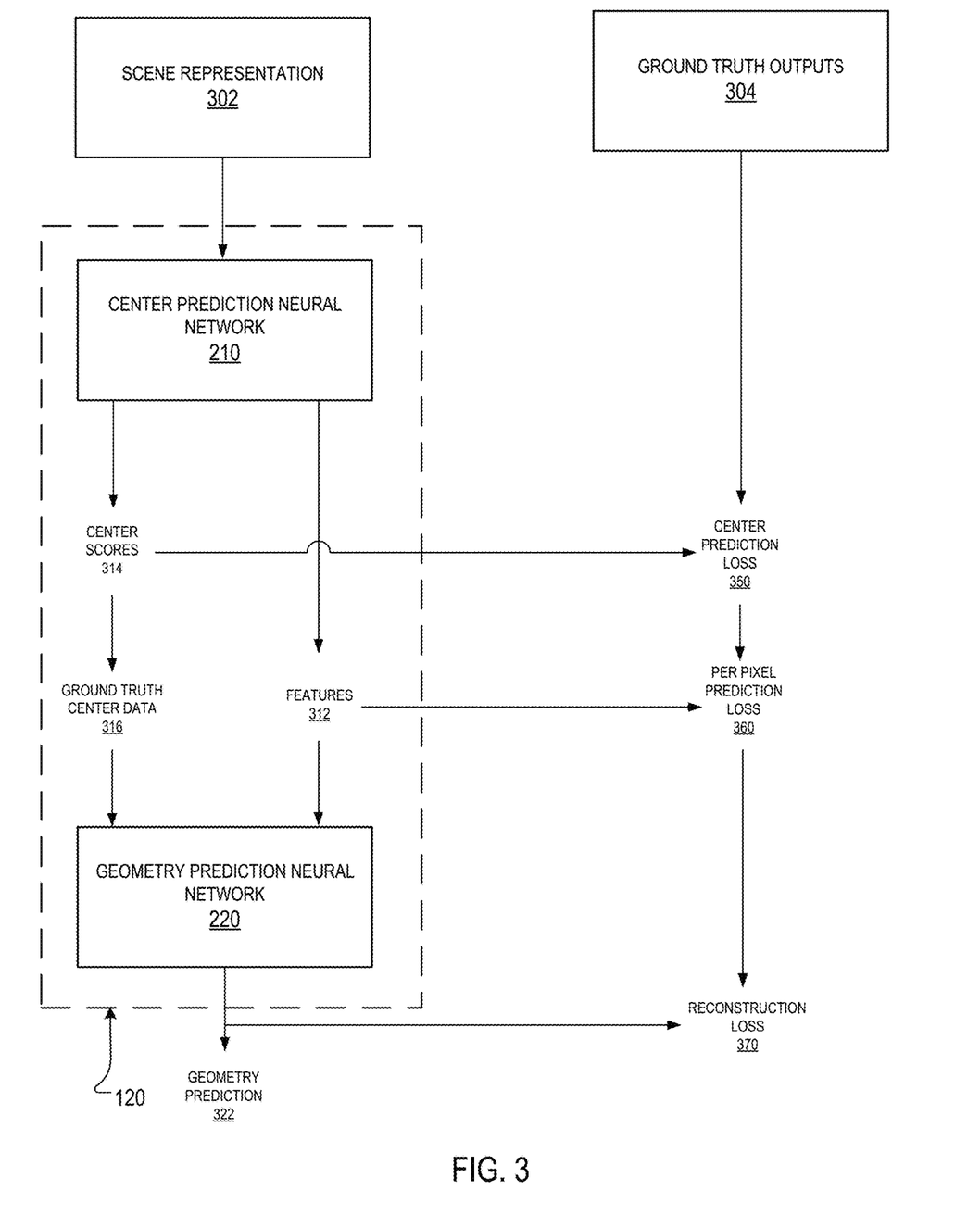
FIG. 3 shows the operation of the training system.

FIG. 3 is a diagram of the operations performed by the training system 120 to train the center prediction neural network 210 and the geometry prediction neural network 220.

At a given iteration of the training process, the training system 120 can perform these operations on each training example in a batch of training examples to update the parameters of the neural networks 210 and 220. As described above, each training example includes a scene representation 302 and a ground truth output 304 for the scene representation.

Each ground truth output 304 generally includes a respective ground truth geometry prediction for each of one or more regions represented in the scene representation 302. In the example of FIG. 3, the ground truth output 304 also includes (i) a ground truth pixel score for each pixel in the scene representation 302 that represents whether the pixel is part of any region instance in the scene representation 302 and (ii) a respective ground truth center location for each of the one or more regions.

To train the neural networks, the training system 120 processes the representation 302 using the center prediction neural network 210 to generate features 312 of the scene in the environment and center scores 314, i.e., as described above with reference to FIG. 2.

During training, rather than select locations using the center scores 314, for each of the one or more regions specified in the ground truth output 304, the system 120 provides an input to the geometry prediction neural network 220 that includes ground truth center data 316 that identifies the ground truth location of the center of the region and either the features 312 or, when the features that are provided to the geometry prediction neural network 220 after training are the per pixel prediction scores, the ground truth per pixel prediction scores. Providing ground truth scores and ground truth center data as input to the neural network 220 can prevent errors in predictions made by the neural network 210 from adversely impacting the training of the neural network 220.

The system 120 processes the input using the geometry prediction neural network 220 to generate a respective geometry prediction 322 for the corresponding region.

The system 120 trains the neural network to minimize an overall loss that is a combination, e.g., a sum or a weighted sum, of multiple losses: a center prediction loss 350, a reconstruction loss 370 and, optionally, a per pixel prediction loss 360.

The center prediction loss 350 measures errors in center predictions generated by the center prediction neural network 110 relative to region centers specified by the ground truth outputs. For example, the loss 350 can be a focal loss. Thus, this loss 350 encourages the center prediction neural network 110 to generate center scores that accurately reflect the positions of regions of the particular type(s) in input scene representations.

When used, the per pixel prediction loss 360 measures errors in the per pixel predictions relative to region locations specified by the ground truth region geometries. For example, the loss 360 can be a cross-entropy loss. Thus, this loss 350 encourages the center prediction neural network 110 to generate per-pixel predictions that accurately reflect where regions of the particular type(s) are located in input scene representations.

The reconstruction loss 370 measures, for each region in the ground truth output 304, the error between the geometry prediction 322 for the region and the ground truth geometry prediction for the region. For example, the reconstruction loss 370 can be an L2 error or other distance-based error.

As a particular example, the system 120 can sample points both inside and outside of the ground truth region, e.g., according to any appropriate sampling scheme that ensures points both inside and outside the region are sampled. For each sampled point, the system can determine whether the sampled point is inside or outside the region defined by the geometry prediction for the region. The system can then determine the reconstruction loss 370 as a function of the sampled points. That is, the system can determine the loss 370 as a sum or average of the L2 norms (or other distance measures) for each point, where the L2 norm is the L2 norm of the difference between (i) a first value or vector that indicates whether the point is predicted to be inside or outside the region and (ii) a second value or vector that indicates whether the point is actually inside or outside the ground truth region.

Optionally, the loss function can also include other terms that are not shown in FIG. 3. For example, the loss function can also include localization loss that encourages that the origin of each convex be close to at least one interior sample.

As another example, the loss function can also include a decomposition loss which penalizes sampled points which are covered by more than 2 convexes.

As another example, the loss function can also include a guide loss that encourages solutions where each convex contains at least k number of points, where k is a hyperparameter. This loss can be computed akin to reconstruction loss, but is defined for each convex and only the first sampled points are used.

The system 120 can train these components on batches of training examples to minimize the loss described above using any appropriate machine learning training technique, e.g., a gradient descent technique with any appropriate optimizer, e.g., stochastic gradient descent, Adam, rmsProp, or Adafactor. In some implementations, gradients are back-propagated through the neural network 120 and into the neural network 110 during the training of the neural networks on the loss function.

Figure 4:
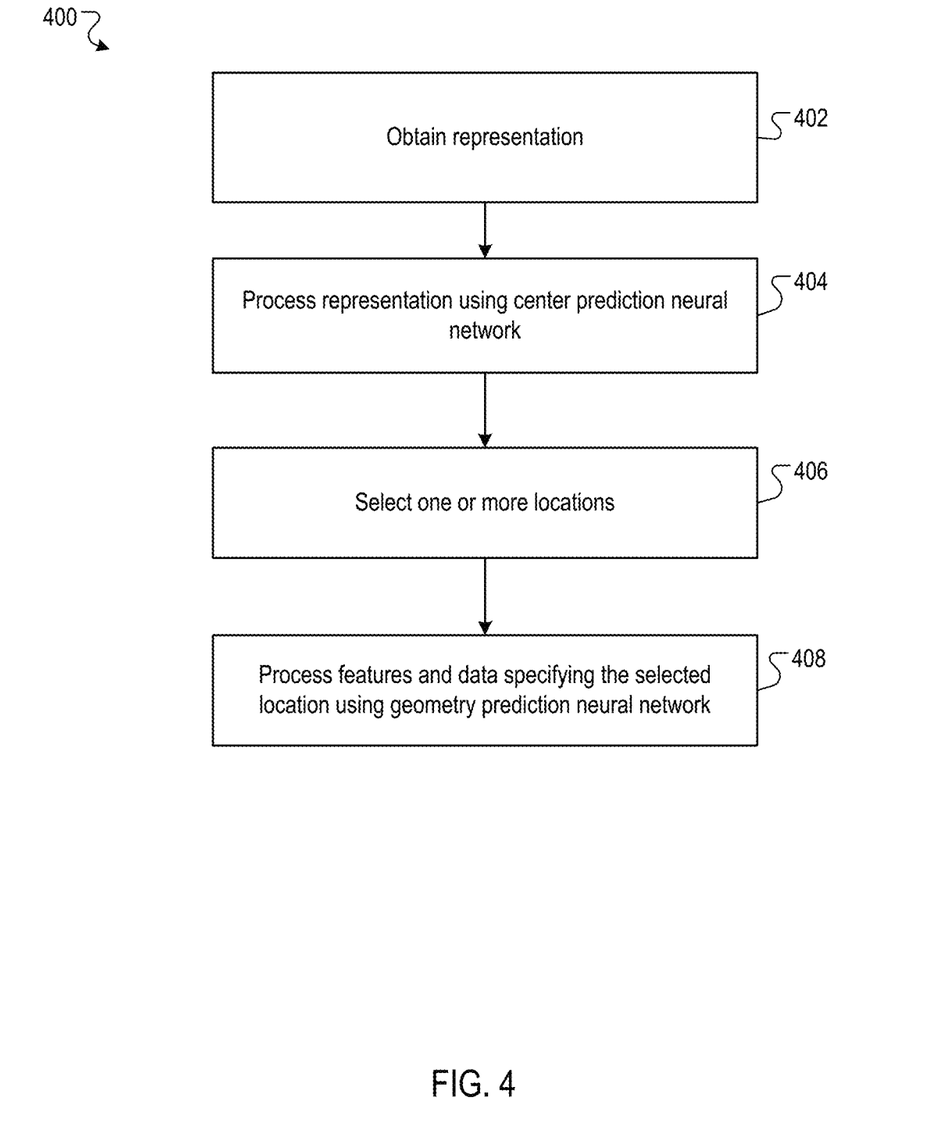
FIG. 4 is a flow diagram of an example process for generating a region detection output.

FIG. 4 is a flow diagram of an example process 400 for generating a region detection output. For convenience, the process 400 will be described as being performed by a system of one or more computers located in one or more locations. For example, a region detection system, e.g., the region detection system 150 of FIG. 1A, appropriately programmed in accordance with this specification, can perform the process 400.

The system receives a representation of a scene in an environment (step 402). As described above, the representation can be a top-down representation generated from laser sensor data.

The system processes the representation using a center prediction neural network to generate: (i) features of the scene in the environment, and (ii) a respective center score corresponding to each of a plurality of locations in the environment (step 408). Each respective center score represents a predicted likelihood that a center of a region is located at the corresponding location in the environment. As described above, the features of the scene can be the outputs of one or more hidden layers of the center prediction neural network or can be respective per pixel scores for each pixel in the representation.

The system selects, based on the respective center scores, one or more of the plurality of locations in the environment (step 406).

For each selected location, the system processes an input that includes the features of the scene in the environment and data specifying the selected location using a geometry prediction neural network to generate a geometry prediction (step 408). The geometry prediction represents a geometry of the region that is centered at the selected location as a collection of one or more convexes by specifying, for each of the one or more convexes, a respective plurality of hyperplanes that define the convex.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   receiving a representation of a scene in an environment;
   processing the representation using a center prediction neural network to generate:
   (i) features of the scene in the environment, and
   (ii) a respective center score corresponding to each of a plurality of locations in the environment, wherein each respective center score represents a predicted likelihood that a center of a region is located at the corresponding location in the environment;
   selecting, based on the respective center scores, one or more of the plurality of locations in the environment; and
   for each selected location:
   processing an input comprising the features of the scene in the environment and data specifying the selected location using a geometry prediction neural network to generate a geometry prediction that represents a geometry of the region that is centered at the selected location as a collection of one or more convexes by specifying, for each of the one or more convexes, a respective plurality of hyperplanes that define the convex.

2. The method of claim 1, further comprising:
   for each selected location, generating a polygonal representation that represents the geometry of the region that is centered at the selected location from the respective plurality of hyperplanes for each of the one or more convexes.

3. The method of claim 1, wherein the representation is a top-down representation of the scene in the environment.

4. The method of claim 3, wherein the representation is generated from raw laser data collected by one or more laser sensors of a vehicle navigating through the environment.

5. The method of claim 3, wherein each of the plurality of locations corresponds to a respective portion of the top-down representation.

6. The method of claim 5, wherein each of the plurality of locations corresponds to a respective pixel in the top-down representation.

7. The method of claim 1, wherein the center prediction neural network is configured to generate a respective pixel prediction score for each of a plurality of pixels in the representation that represents a likelihood that a region instance is depicted at the pixel.

8. The method of claim 7, wherein the features of the scene comprise the respective per pixel prediction scores for the plurality of pixels.

9. The method of claim 1, wherein the features of the scene comprise outputs of one or more hidden layers of the center prediction neural network.

10. The method of claim 1, wherein the data specifying the selected location is a feature map that has a same spatial dimensionality as the features and that identifies the selected location.

11. The method of claim 1, wherein the geometry prediction generated by the geometry prediction neural network includes, for each hyperplane of each convex, parameters of a signed distance function that measures a signed distance of any given point in the environment from the hyperplane.

12. The method of claim 11, wherein the parameters of the signed distance function include a normal corresponding to the hyperplane.

13. The method of claim 11, wherein the parameters of the signed distance function include an offset of the hyperplane from the origin.

14. The method of claim 1, wherein the geometry prediction neural network comprises an encoder neural network configured to process the input to generate a set of hyperplane parameters and a decoder neural network configured to process the set of hyperplane parameters to generate the geometry prediction.

15. The method of claim 1, wherein the center prediction neural network and the geometry prediction neural network have been trained jointly on a set of training data that includes a plurality of training representations and for each training representation a set of ground truth region geometries.

16. The method of claim 15, wherein the center prediction neural network and the geometry prediction neural network have been trained jointly to minimize a loss function that includes a (i) a reconstruction loss that measures errors in geometry predictions relative to the ground truth region geometries and (ii) a center prediction loss that measures errors in center predictions generated by the center prediction neural network relative to region centers specified by the ground truth region geometries.

17. The method of claim 16, wherein the center prediction neural network is configured to generate a respective pixel prediction score for each of a plurality of pixels in the representation that represents a likelihood that a region instance is depicted at the pixel, and wherein the loss function also includes (iii) a per pixel prediction loss that measures errors in the per pixel predictions relative to region locations specified by the ground truth region geometries.

18. The method of claim 17, wherein the loss function also includes (iv) a localization loss.

19. The method of claim 16, wherein during the joint training the geometry prediction neural network receives as input locations of region centers specified by the ground truth region geometries rather than locations selected based on center predictions generated by the center prediction neural network.

20. A system comprising:
one or more computers; and
one or more storage devices storing instructions that, when executed by the one or more computers, cause the one or more computers to perform operations comprising:
receiving a representation of a scene in an environment;
processing the representation using a center prediction neural network to generate:
(i) features of the scene in the environment, and
(ii) a respective center score corresponding to each of a plurality of locations in the environment, wherein each respective center score represents a predicted likelihood that a center of a region is located at the corresponding location in the environment;
selecting, based on the respective center scores, one or more of the plurality of locations in the environment; and
for each selected location:
processing an input comprising the features of the scene in the environment and data specifying the selected location using a geometry prediction neural network to generate a geometry prediction that represents a geometry of the region that is centered at the selected location as a collection of one or more convexes by specifying, for each of the one or more convexes, a respective plurality of hyperplanes that define the convex.

21. One or more non-transitory computer-readable storage media storing instructions that when executed by one or more computers cause the one or more computers to perform operations comprising:
receiving a representation of a scene in an environment;
processing the representation using a center prediction neural network to generate:
(i) features of the scene in the environment, and
(ii) a respective center score corresponding to each of a plurality of locations in the environment, wherein each respective center score represents a predicted likelihood that a center of a region is located at the corresponding location in the environment;
selecting, based on the respective center scores, one or more of the plurality of locations in the environment; and
for each selected location:
processing an input comprising the features of the scene in the environment and data specifying the selected location using a geometry prediction neural network to generate a geometry prediction that represents a geometry of the region that is centered at the selected location as a collection of one or more convexes by specifying, for each of the one or more convexes, a respective plurality of hyperplanes that define the convex.

* * * * *